W. DANIELS.
Assignor to H. E. TOWLE.
Fare-Registers.
No. 8,019. Reissued Dec. 25, 1877.
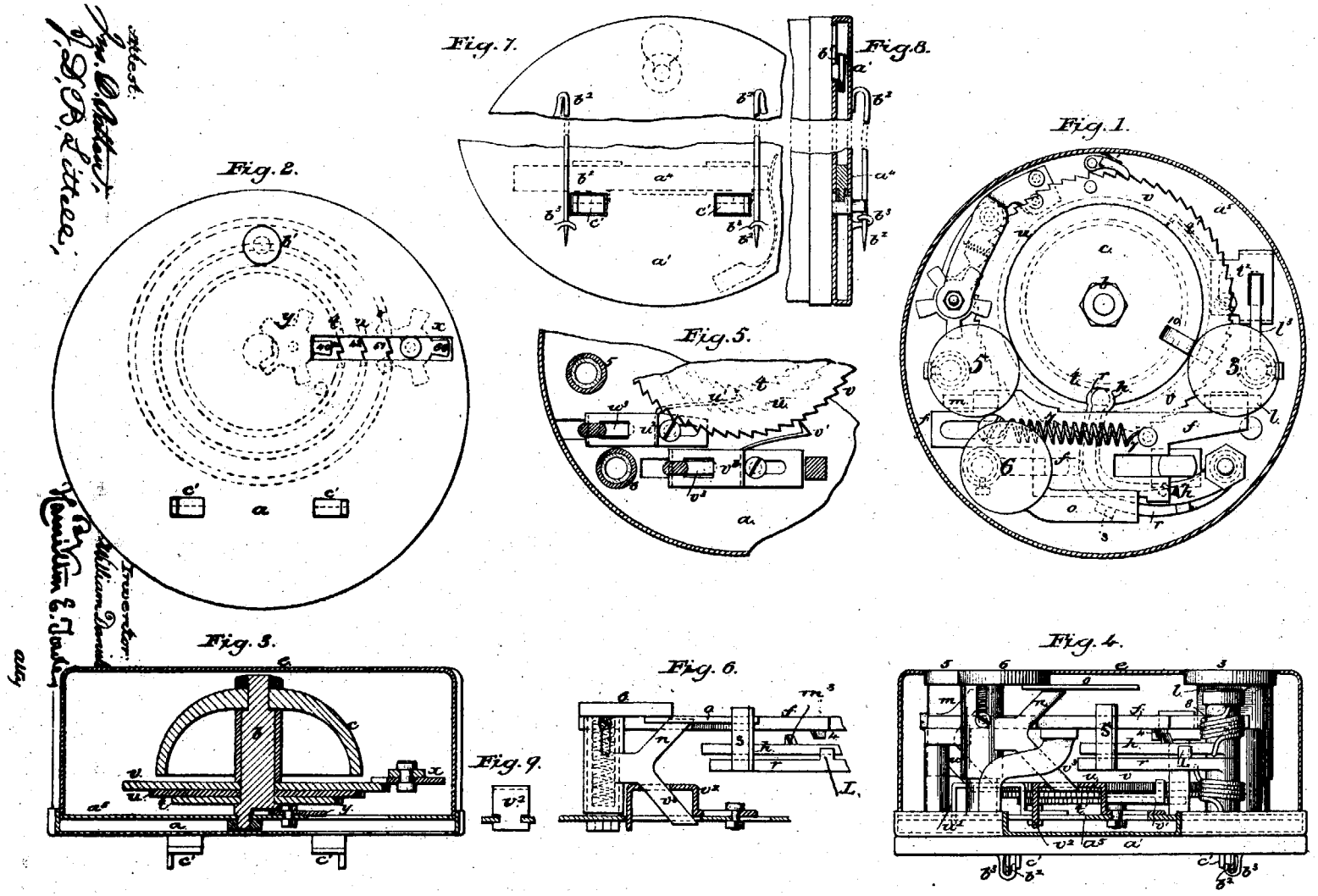

UNITED STATES PATENT OFFICE.

WILLIAM DANIELS, OF NEW YORK, N. Y., ASSIGNOR TO HAMILTON E. TOWLE.

IMPROVEMENT IN FARE-REGISTERS.

Specification forming part of Letters Patent No. 150,539, dated May 5, 1874; Reissue No. 8,019, dated December 25, 1877; application filed August 23, 1876.

*To all whom it may concern:*

Be it known that I, WILLIAM DANIELS, of the city of New York, State of New York, have invented an Improvement in Fare-Registers for Conductors on Street-Cars, &c., of which the following is a specification:

This invention is for keeping tally of the fares received by the conductor; and as generally there are two or three rates of fares, I provide separate counting-dials and push-buttons, one for each rate of fare, and arrange them to act upon one hammer-slide that moves the hammer for striking the bell, but the parts are made to indicate different sounds on the bell. It is arranged in a box or case to be carried by the conductor, the said box containing independent registering devices, so constructed and combined with other mechanism that the registering of each fare shall be accompanied by the sounding of an alarm or alarms, and thus effect in one compact machine a complete check upon conductors, by compelling them to sound an alarm as each fare is received, to prevent the sounding of an alarm without registering, and to record each fare received, so that the total amount of each class may be read off at any subsequent time.

The bell is struck by an independent mechanism of its own, which is so connected with the separate push-knobs that the pressing of any one of the buttons will ring the bell or gong within the case, but only actuate its own particular register.

It consists in the arrangement of two or more counting-registers in one case.

Each counting-register is actuated by its own separate button or knob on the outside, which the car-conductor presses to record the character of the fare received. The proper button to press is indicated in close proximity to the button, so that the passenger himself can see if the proper button is struck. I also employ a peculiar locking mechanism for attaching the instrument to the coat or garment of the conductor.

The object of my invention is to construct an instrument which shall record and classify the amounts received as fares from passengers; to provide a check upon conductors of cars and other public vehicles, by compelling them, as each fare is received, to register the same upon the disks, and to attract the attention of the passengers to the act of registering by sounding an alarm upon the bell *c*, one stroke indicating that a full fare has been registered upon the disk *u*, and two strokes in quick succession from the hammers *r* and *h* (which may differ in tone from the one stroke of the hammer) indicating the registering of a half-fare upon the disk *u*.

In the drawing, Figure 1 is a view of the register with the cap removed. Fig. 2 is a rear view. Fig. 3 is a section of the bell and of the registering mechanism. Fig. 4 is an elevation of the actuating mechanism. Fig. 5 shows the slides and spring-pawls acting on the counting-wheels. Fig. 6 shows the construction of the push-button and slides. Fig. 7 represents the attaching-plate. Fig. 8 is a section of the same, and Fig. 9 shows part of one of the slides.

The plate $a^5$ has a stud, *b*, that carries a bell, *c*, and the other operative portions of the register. There are also two or more push-buttons. I have shown three, marked 3, 5, and 6, as illustrative of the value of the fares they are intended to compute. These push-buttons are each mounted upon a sleeve, that surrounds a hollow stud projecting from the plate $a^5$, and in which hollow stud is a helical spring to project the button to the level of the cap-plate *e*, or nearly so. A screw in a slot acts as a guide, and limits the extent of movement. This cap-plate *e* is provided with openings for the push-buttons, and, by preference, a number is upon such cap-plate to indicate the number of the instrument or the car with which it is used. The hammer-slide *f* is provided with a tooth, 4, that acts upon the hammer-tail *h* to throw back the latter, and when liberated the spring 8, Fig. 4, causes the hammer to strike the bell, after which the spring 7, Fig. 1, returns the slide and parts to a normal position. This slide *f* is moved by the inclined arm *l* of the push-button 3, or the inclined arm *m* of the push-button 5, or by the inclined arm *n* of the push-button 6, so that the hammer will be operated to strike the bell one blow when either push-button is operated by the finger of the conductor pressed upon it. In order that different sounds may be produced, I connect with the push-button 3 a slight spring, 10, which, coming into contact with the bell as such button 3 is pressed in, deadens the sound. When the button 6 is pressed down, the arm $n$ thereof moves the bell-hammer slide $f$ and hammers, as before, and brings the finger or detent $o$ into the path of the projecting tooth or bearing-place $s$ of the secondary hammer-arm $r$, as illustrated in Fig. 6, so that one hammer, $h$, will strike as usual; but the arm $r$ will be held back by the detent or finger $o$ until the push-button 6 is allowed to rise, when the detent $o$, moving from its projecting bearing-place $s$, belonging to the other hammer $r$, allows the spring of that hammer to project the same and give a second blow. By these means the hammer will strike one distinct blow when the push-button 5 is depressed, there will be two blows when the push-button 6 is operated, and a deadened sound of the bell when the button 3 is depressed. The tooth, stop, or lever L, extending from one hammer-lever, $r$, to the other hammer-lever, $h$, causes both hammers to move together and strike one single blow when the detent $o$ is not employed.

The computation of the fares is made upon the registers or disks $t$ $u$ $v$, that are made with ratchet-teeth, and numbered on their surfaces, to indicate either the number of the fares or the accumulated value in cents.

The register works continuously without setting, and by subtracting the figures at any given trip from the amount recorded at the next succeeding one, the number of fares received is ascertained.

The disk $u$ for half-fares is operated by the spring-pawl $t^1$ on the slide $t^2$, that is moved by the inclined arm $t^3$ of the push-button 3. The disk $t$ is operated by the spring-pawl $u^1$ on the slide $u^2$, that is moved by the inclined arm $u^3$ of the push-button 5, and the disk $v$ is operated by the spring-pawl $v^1$ and slide $v^2$, and the inclined arm $v^3$ on the push-pin 6.

Retaining-pawls should be applied to each disk to prevent them turning the wrong way, and the disks $t$ and $v$ have applied to them star-wheels $x$ and $y$, to turn one tooth each revolution of the respective disk, and thereby enumerate the accumulation of fares by more than one revolution of the respective disks. The numbers on the disks and star-wheels are observed through an opening in the back plate $a$, as seen in Figs. 2 and 3, and this opening is covered by a movable attaching-plate, $a^1$, that is made double, and provided with an opening in the portion that is next to the plate $a$, and into this the button-headed stud $b^1$ slips, and there are locking projections $c'$ $c'$ attached to the plate $a$, and passing into holes in the attaching-plate $a^1$, and a suitable locking-bolt is inserted between the two plates of the movable back $a^1$, as seen at $a^4$, which, passing into grooves in the side of the projections $c'$, retain the back $a^1$ to the plate $a$. This bolt $a^4$ is operated by a key of suitable construction, introduced, by preference, through a key-hole at the edge of $a^1$, and this key and locking-bolt, with its tumblers or safety appliances, are to be of any usual character, so that the back $a^1$ can only be removed for access to the computing-disks by a properly-authorized person. The locked plate or lid covers the openings over the counting-registers, through which they can be read through a glass plate by the receiver and the amount entered in a book at the end of every trip. The glass plate is covered by a locked lid, so that the conductor cannot examine the state of the register. By this he is prevented from knowing the state of the register, and if any attempt should be made to defraud by striking the wrong knob, there is no probability of the conductor harmonizing his account to correspond, as he is working in the dark.

To secure the register to the coat or other part of the conductor's garments, I provide the pins $b^2$, that are fastened to the back $a^1$, and hook beneath the catches $b^3$, and these are contiguous to the ends of $c'$ $c'$, that project through the back plate $a^1$; hence, by securing the back $a^1$ to the garment by the pins $b^2$ before the back $a^1$ is pressed against the plate $a$, the projections $c'$ will close the hooks or catches $b^3$, so that the pins cannot be unhooked or the instrument removed.

I claim as my invention and desire to secure by Letters Patent—

1. The combination of push-buttons having inclined arms actuating the registering mechanism, and operating the slide controlling the hammers, to denote different sounds upon the bell, with the hammers, a bell, and a slide, substantially as set forth.

2. A push-button provided with the inclined arms, which move therewith, in combination with the main hammer, bell, and registering mechanism, substantially as described, for the purpose specified.

3. The push-button made with a tube sliding on a hollow stud, and provided with a spring and two inclined arms, one to actuate the hammer, and the other to move the computing wheels or mechanism, as set forth.

4. The spring 10 upon the push-button 3, to pass upon the bell when said push-button is moved, for the purposes specified.

5. A movable back connected to the plate $a$ of the instrument, and secured in place by a lock, and serving to cover the opening through which the computing-disks are examined, as set forth.

6. The pins $b^2$ and hooks $b^3$, for attaching the back $a^1$ to the garment, in combination with the projections $c'$ on the plate $a$, and the mechanism for locking the back $a^1$ to the plate $a$, substantially as set forth.

7. The combination, in a single case, of two or more counting-registers, an alarm-bell, and a single intermediate striking mechanism, consisting of a slide-bar, operated by either of the several push-knobs, substantially as hereinbefore set forth.

8. In an alarm-register, the bell and striking mechanism, in combination with suitable means for modifying the sound of the bell, substantially as described.

9. In fare-registering machines, a tubular push-knob, in combination with the inclosed spring, substantially as set forth.

10. The combination of two or more push-knobs, actuating the registering mechanism, corresponding to two or more different rates of fare, with an actuating-slide, driving a bell-hammer by means of an intermediate pin or tooth, and a spring to return the slide to its normal position, substantially as set forth.

Dated in the city of New York this 23d day of May, 1876.

WILLIAM DANIELS.

Witnesses:

JACOB DU BOIS,
JOHN B. BENTON.